(12) United States Patent
Ishikawa

(10) Patent No.: US 7,612,333 B2
(45) Date of Patent: Nov. 3, 2009

(54) IMAGING APPARATUS AND PHOTOELECTRIC CONVERSION ELEMENT PACKAGE RETAINING UNIT

(75) Inventor: Koji Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/196,912

(22) Filed: Aug. 22, 2008

(65) Prior Publication Data

US 2009/0050795 A1 Feb. 26, 2009

(30) Foreign Application Priority Data

Aug. 24, 2007 (JP) ............................. 2007-218088

(51) Int. Cl.
 *H01J 5/02* (2006.01)
(52) U.S. Cl. ...................... 250/239; 348/374; 257/433; 257/698
(58) Field of Classification Search ................ 250/239, 250/208.1; 348/374, 340, 335; 257/433–434, 257/693, 698, 773
See application file for complete search history.

(56) References Cited

U.S. PATENT DOCUMENTS

2009/0146051 A1 * 6/2009 Ishikawa ..................... 250/239

FOREIGN PATENT DOCUMENTS

JP 11-261904 9/1999

* cited by examiner

*Primary Examiner*—Kevin Pyo
(74) *Attorney, Agent, or Firm*—Canon USA Inc IP Div

(57) ABSTRACT

A photoelectric conversion element package retaining unit includes a photoelectric conversion element package having electrodes formed on a rear surface of a light-receiving surface, a printed circuit board electrically connected to the electrodes, and a retaining member configured to retain the photoelectric conversion element package. The printed circuit board includes a first opening formed in an area corresponding to an inside of the electrodes. The retaining member includes a positioning unit configured to position the photoelectric conversion element package in an axial direction orthogonal to the light-receiving surface by abutting on the photoelectric conversion element package outside the electrodes, and a second opening formed to pour an adhesive into the area corresponding to the inside of the electrodes.

10 Claims, 8 Drawing Sheets

IMAGING APPARATUS AND PHOTOELECTRIC CONVERSION ELEMENT PACKAGE RETAINING UNIT

BACKGROUND OF THE INVENTION

1. Field of the Invention

The present invention relates to an imaging apparatus having a photoelectric conversion element package and a position retaining member for retaining a position of the photoelectric conversion element package and the photoelectric conversion element package used for the imaging apparatus.

2. Description of the Related Art

With an increase in pixel density of a photoelectric conversion element, a need for highly accurate positioning of a light-receiving surface of the photoelectric conversion element relative to an image-forming surface of a photographic lens optical system has increased. Accordingly, a mechanism capable of adjusting a position of the photoelectric conversion element relative to a lens barrel needs to be provided.

Japanese Patent Application Laid-Open No. 11-261904 discusses a technique for providing a position retaining member for determining and fixing a position of a photoelectric conversion element package in an optical-axis direction of a lens barrel and for fixing the position retaining member and the photoelectric conversion element package. In addition, a method for highly accurate positioning of a light-receiving surface of the photoelectric conversion element relative to an image-forming surface of a photographic lens optical system by fine adjustment of a relative position between the lens barrel and the position retaining member in the direction of the optical axis is discussed.

Further, under a request of miniaturization and thinning of an imaging apparatus, there have appeared some techniques for reducing a total thickness of a photoelectric conversion element package, a position retaining member, and a printed circuit board loaded with the photoelectric conversion element package. One of these techniques uses a leadless type photoelectric conversion element package and is capable of fixing positions of the photoelectric conversion element package and a position retaining member with a printed circuit board disposed there between.

In recent years, with further improvement of a pixel density, functionality of a photoelectric conversion element, and multifunctionalization of the photoelectric conversion element package such as the photoelectric conversion element package including a built-in driver integrated circuit (IC), a number of electrodes required to connect a printed circuit board with the photoelectric conversion element package is increasing. Thus, a conventional photoelectric conversion element package on which electrodes are formed only at four sides has become insufficient.

Accordingly, a method for accommodating multiple pins by arranging electrodes in a grid pattern on a rear surface of the photoelectric conversion element package such as a ball grid array (BGA) type and a land grid array (LGA) type packages is discussed.

However, in the above described conventional techniques, mounting a photoelectric conversion element package on a printed circuit board, positioning and bonding the photoelectric conversion element package to a position retaining member are all performed on the rear surface of the package, thus multiple pins by means of a package such as BGA or LGA types is difficult to use.

SUMMARY OF THE INVENTION

The present invention is directed to a photoelectric conversion element package retaining unit and an imaging apparatus incorporating the same. According to an aspect of the present invention, a photoelectric conversion element package retaining unit includes a photoelectric conversion element package including electrodes formed on a rear surface of a light-receiving surface, a printed circuit board electrically connected to the electrodes of the photoelectric conversion element package, and a retaining member configured to retain the photoelectric conversion element package. The printed circuit board includes a first opening formed in an area corresponding to an inside of the electrodes of the photoelectric conversion element package. The retaining member includes a positioning unit configured to position the photoelectric conversion element package in an axial direction orthogonal to the light-receiving surface by abutting on the photoelectric conversion element package outside the electrodes of the photoelectric conversion element package, and a second opening formed to pour an adhesive into the area corresponding to the inside of the electrodes of the photoelectric conversion element package.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
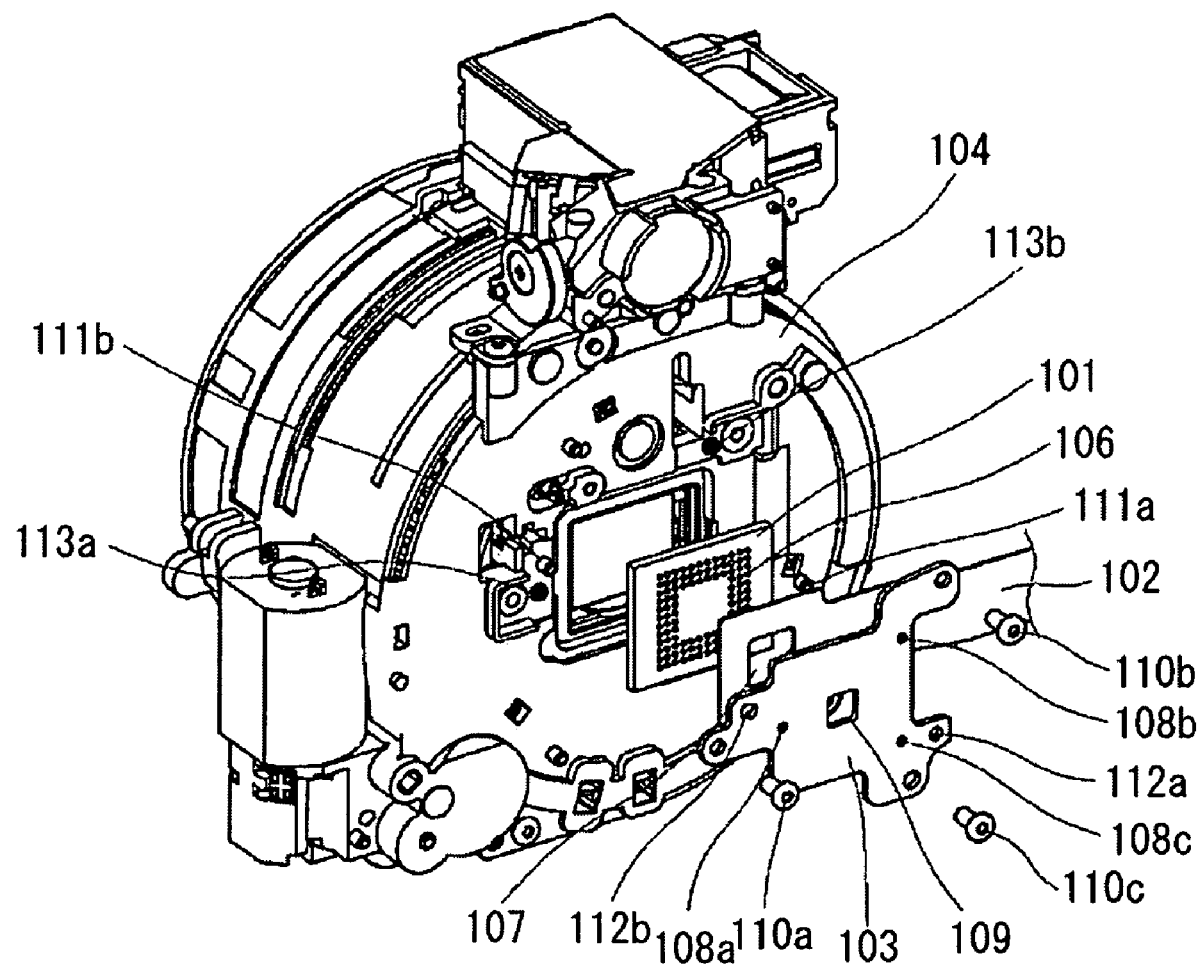
FIG. 1 is an exploded perspective view illustrating a structure of an imaging apparatus according to an exemplary embodiment of the present invention.

FIG. 1 is an exploded perspective view illustrating a structure of an imaging apparatus according to an exemplary embodiment of the present invention. The imaging apparatus includes a photoelectric conversion element package 101, a printed circuit board 102, a position retaining member 103, and a photographic lens barrel unit 104.

Figure 2:
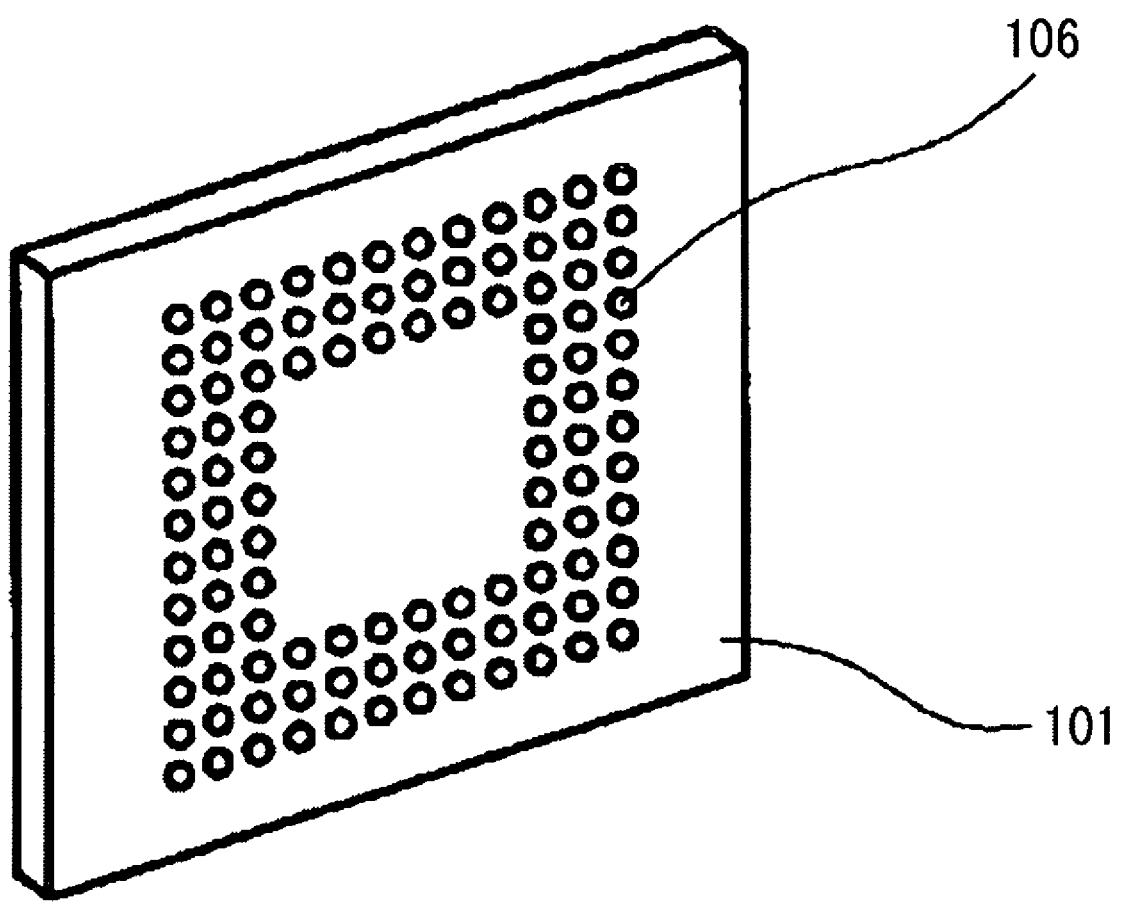
FIG. 2 is a perspective view illustrating a rear surface of a photoelectric conversion element package in the imaging apparatus according to the exemplary embodiment of the present invention.
Figure 7A:
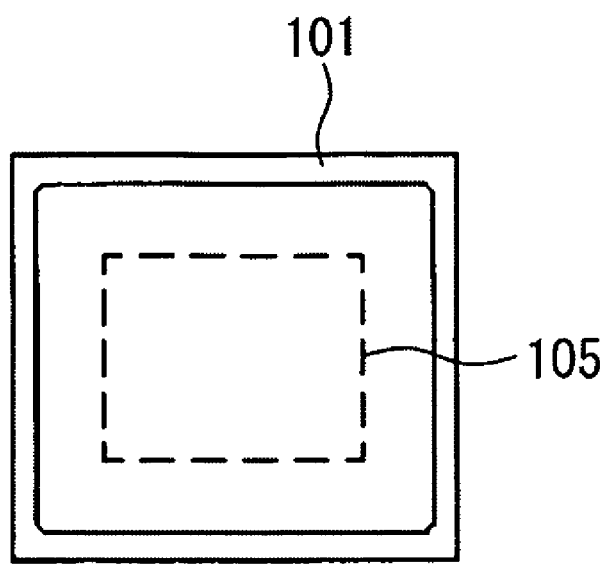
FIGS. 7A to 7C illustrate a structure of the photoelectric conversion element package in the imaging apparatus according to the exemplary embodiment of the present invention.
Figure 7B:
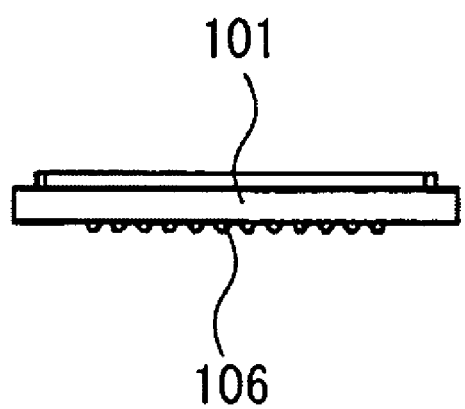
Figure 7C:
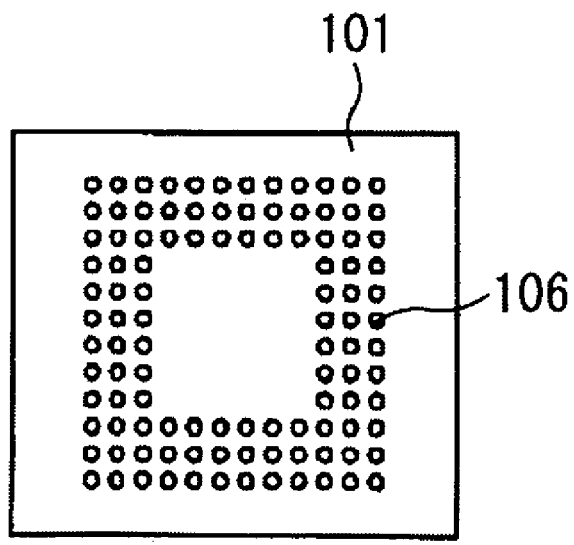

The photoelectric conversion element package 101 includes a photoelectric conversion element 105 (FIG. 7A). The photoelectric conversion element package 101 has a light-receiving surface of the photoelectric conversion element 105 on a photographic lens (not illustrated) side of the photographic lens barrel unit 104. In addition, the photoelectric conversion element package 101, as illustrated in FIGS. 2, 7B and 7C, is a BGA type package in which a plurality of electrodes 106 are formed with solder balls arranged on a rear surface of the light-receiving surface in a grid pattern. FIG. 2 is a perspective view illustrating the rear surface of the photoelectric conversion element package 101. FIGS. 7A to 7C illustrate a structure of the photoelectric conversion element package 101. FIG. 7A is a top view of the photoelectric conversion element package 101, FIG. 7B is a side view thereof, and FIG. 7C is a bottom view thereof. The electrodes 106, as illustrated in FIG. 7C, are arranged on the rear surface of the package in a doughnut shape while regions without the electrodes 106 are arranged on an outer-periphery portion and a central portion (inside portion).

Figure 3:
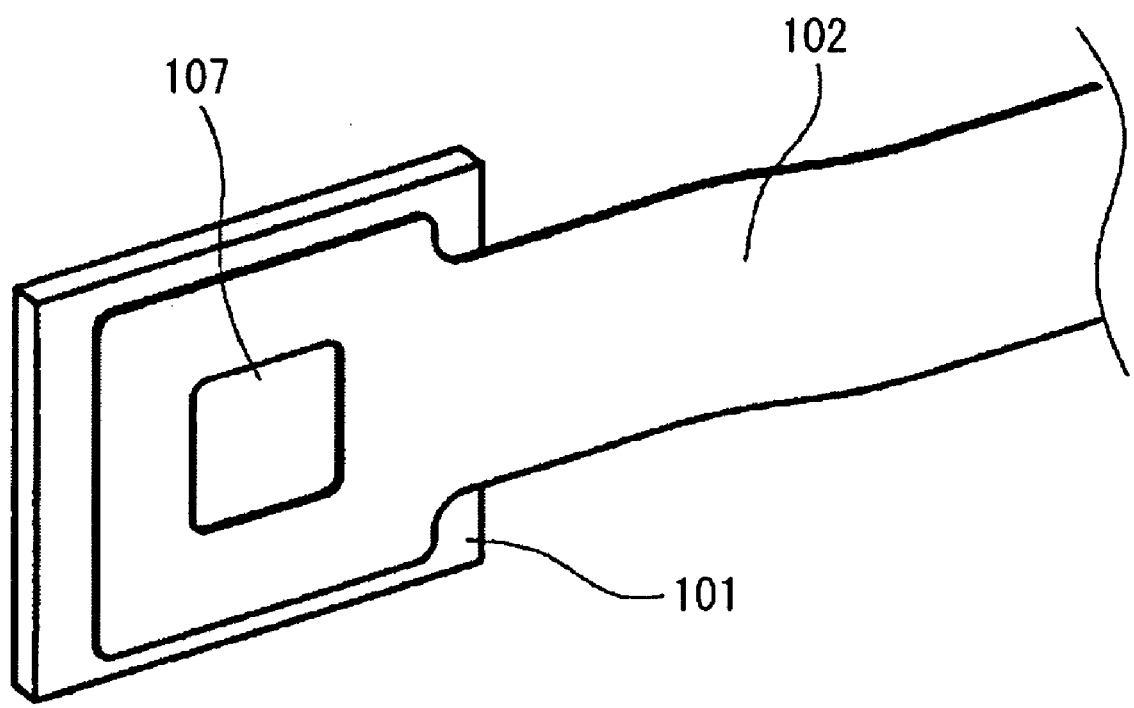
FIG. 3 is a perspective view illustrating a mounted state of the photoelectric conversion element package on a printed circuit board in the imaging apparatus according to the exemplary embodiment of the present invention.

The photoelectric conversion element package 101 is, as illustrated in FIG. 3, mounted on the printed circuit board 102. The printed circuit board 102 has a land (not illustrated) which is formed at a position corresponding to the electrodes 106 of the photoelectric conversion element package 101. The printed circuit board 102 is reflow-soldered to the photoelectric conversion element package 101, so that the solder balls which form the electrodes 106 are molten, and bonded and electrically connected to the land formed on the printed circuit board 102. Since the electrodes 106 of the photoelectric conversion element package 101 are the BGA type, the printed circuit board 102 is a multi-layered flexible printed circuit board in consideration of taking-out of a signal line and flexibility of the printed circuit board 102 with the taken-out signal line. In the present exemplary embodiment, especially to satisfy both the wiring workability in taking out the signal line and printed circuit board flexibility, the printed circuit board 102 includes a portion on which the photoelectric conversion element package 101 is mounted having four layers and a flexible portion having three layers. At this time, the signal line of the photoelectric conversion element package 101 is taken out according to a pattern formed on the printed circuit board 102 from the land connected with the electrodes 106. However, even if it is difficult to be taken out the pattern at a surface layer because the pitch of the land is narrow, the pattern can be connected to an inner layer of the printed circuit board 102 using a laser via and the pattern can be taken out through the inner layer. At this time, an outer wiring layer can serve as a ground (GND) layer to provide a high shield effect by sandwiching a signal which is susceptible to noise or easily generate useless radiation therewith. In addition, a signal which is susceptible to noise, such as an analog output signal from the photoelectric conversion element and a high-speed clock signal for driving the photoelectric conversion element are wired in different wiring layers, and the GND layer is sandwiched between the mutual wiring layers. Hence, the analog output signal can not be affected by the high-speed clock signal and a thick path for a return current of the high-speed clock signal can be secured.

As insulating layers on the front and rear surfaces of the printed circuit board 102, a liquid photoresist capable of forming a land opening with high accuracy is used in the portion on which the photoelectric conversion element package 101 is mounted for a highly accurate positioning of mounting. On the other hand, a cover film made of polyimide is used on the rear surface to ensure the insulation between a wiring pattern and the position retaining member 103 (in the present exemplary embodiment, the position retaining member 103 is made of metal, which will be described below).

The portion on which the photoelectric conversion element package 101 is mounted in the printed circuit board 102 has an outermost shape smaller than an outer shape of the photoelectric conversion element 101. The printed circuit board 102 has an opening 107 at a portion corresponding to the region without the electrodes 106 which is the center of the rear surface of the photoelectric conversion element package 101.

Figure 4:
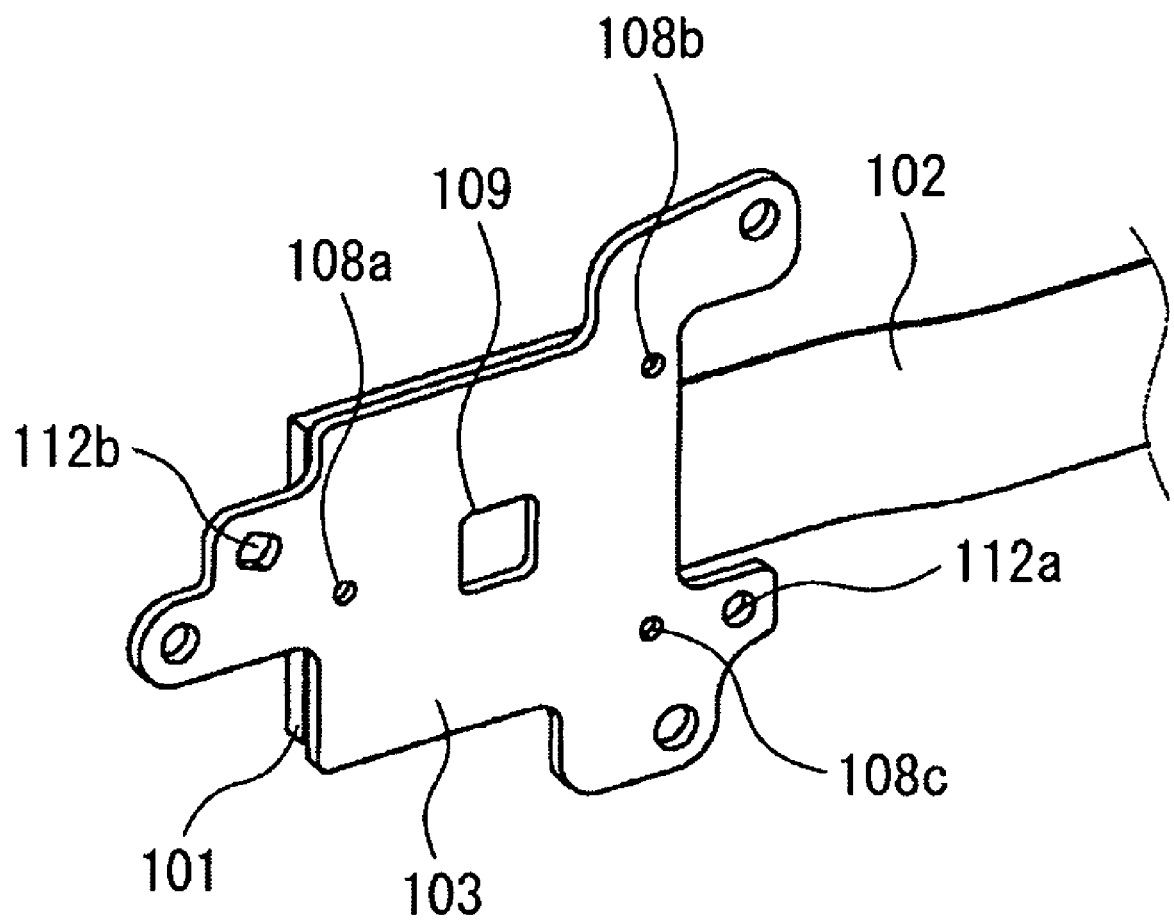
FIG. 4 is a perspective view in a fixed state of the photoelectric conversion element package and a position retaining member in the imaging apparatus according to the exemplary embodiment of the present invention.

Next, the photoelectric conversion element package 101 mounted on the printed circuit board 102 is fixed on the position retaining member 103 as illustrated in FIG. 4.

Figure 8:
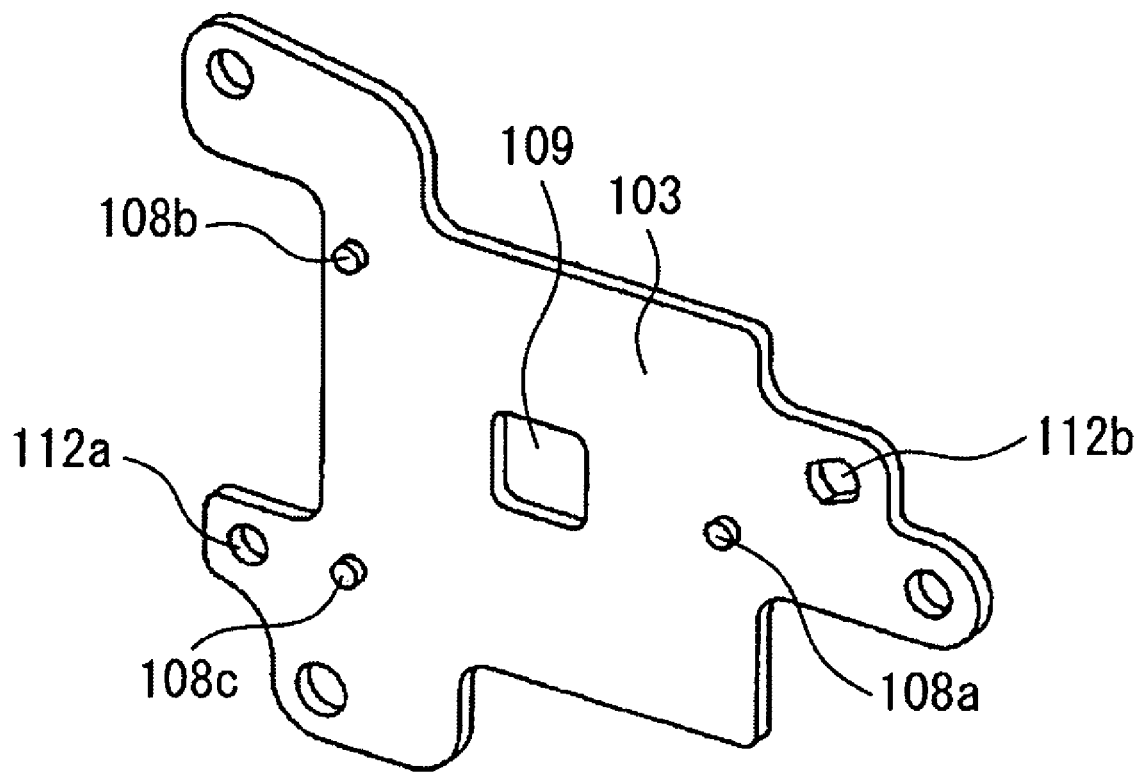
FIG. 8 is a perspective view of the position retaining member in the imaging apparatus according to the exemplary embodiment of the present invention.

The position retaining member 103 is a metal plate. The position retaining member 103 has protrusions 108a to 108c for determining and fixing a position of the photoelectric conversion element package 101 in an optical-axis direction of the photographic lens barrel unit 104. The protrusions 108a to 108c are formed by half punching. The protrusions 108a to 108c are formed on a surface facing to the rear surface of the photoelectric conversion element package 101 as illustrated in FIG. 8 and abut on an outer region of the electrodes 106 of the photoelectric conversion element package 101 so as to position the photoelectric conversion element package 101 in the axial direction orthogonal to the light-receiving surface. Further, an opening 109 is formed at a portion corresponding to the region without the electrodes 106, which is the center of the rear surface of the photoelectric conversion element package 101, and to the opening 107 in the printed circuit board 102. To secure a margin to attach the photoelectric conversion element package 101 to the position retaining member 103, the opening 109 can be made a little smaller than the opening 107 formed in the printed circuit board 102. Alternatively, a portion that is not overlapped with the printed circuit board 102 can be prepared. In the present exemplary embodiment, although the position retaining member 103 is made of metal, a resin molded member having sufficient strength can be used to attain the same effect.

When the photoelectric conversion element package 101 is fixed with the position retaining member 103, first, a relative position of the photoelectric conversion element package 101 in the planar direction orthogonal to the optical axis is fixed using a jig (not illustrated). At this time, the protrusions 108a to 108c formed on the position retaining member 103 abuts on the rear surface of the photoelectric conversion element package 101 and the relative position of the photoelectric conversion element package 101 to the optical-axis direction is determined. Then, an adhesive is poured into a clearance between the photoelectric conversion element package 101 and the position retaining member 103 from the opening 109 formed on the position retaining member 103 to bond and fix the photoelectric conversion element package 101 and the position retaining member 103.

Figure 5:
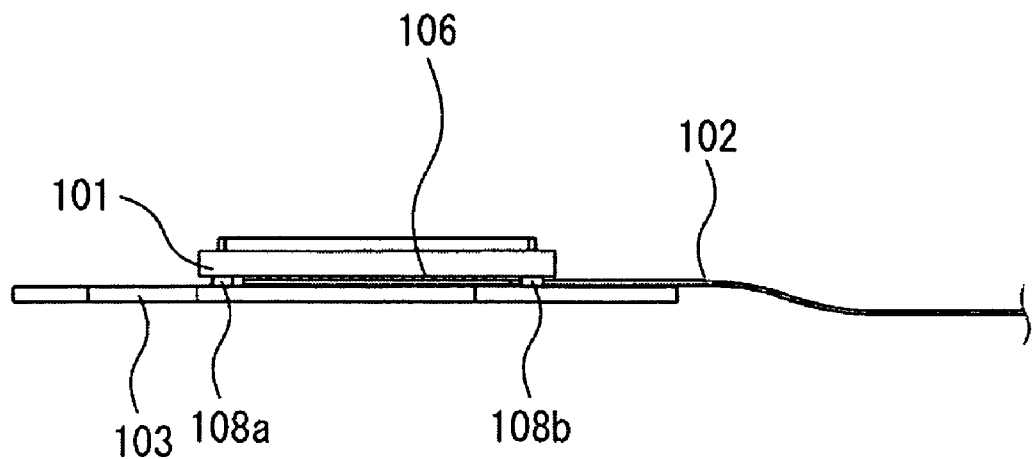
FIG. 5 is a top view in the same state as in FIG. 4.
Figure 6:
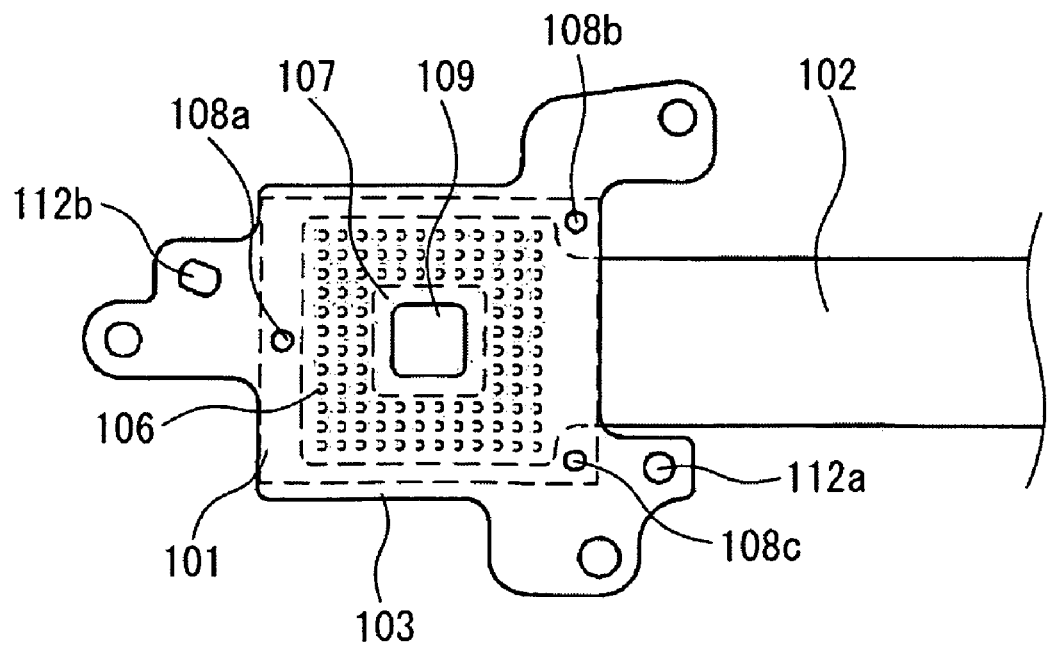
FIG. 6 is a perspective plan view in the same state as in FIG. 4.

The positional relationship in the thickness direction among the photoelectric conversion element package 101, the printed circuit board 102 and the position retaining member 103 is illustrated in FIG. 5, and the relationship in the planar direction is illustrated in FIG. 6.

Each height of the protrusions 108a to 108c formed on the position retaining member 103 is set larger than a distance from the rear surface of the photoelectric conversion element package 101 to the rear surface of the printed circuit board 102 after mounted on the printed circuit board 102. Accordingly, the position of the photoelectric conversion element package 101 in the optical-axial direction can be determined directly by the position retaining member 103 with the photoelectric conversion element package 101 being mounted on the printed circuit board 102. The positioning, as illustrated in FIG. 6, can be performed in a space having no electrode 106 that is provided on an outer-periphery side (outside) of the electrodes 106 of the rear surface of the photoelectric conversion element package 101. Accordingly, the intervals of the protrusions 108a to 108c can be secured as large as possible on the rear surface of the photoelectric conversion element package 101. Thus, the highly accurate positioning can be performed while variations in the planar position of the photoelectric conversion element 105 with respect to the position retaining member 103 can be minimized relative to manufacturing variation of the height of the protrusions 108a to 108c.

Each height of the protrusions 108a to 108c can be set with high accuracy to a value extremely close to the distance from the rear surface of the photoelectric conversion element package 101 to the rear surface of the printed circuit board 102 in a state where the photoelectric conversion element package 101 is mounted on the printed circuit board 102. Hence, a total thickness from the photoelectric conversion element package 101 to the position retaining member 103 can be minimized.

Through the opening 107 in the printed circuit board 102 and the opening 109 in the position retaining member 103 corresponding to the region having no electrode 106 in the center of the rear surface of the photoelectric conversion element package 101, the clearance is formed between the photoelectric conversion element package 101 and the position retaining member 103. The adhesive is poured into the clearance, and the photoelectric conversion element package 101 and the position retaining member 103 can be adhesively fixed. At the same time, the adhesive fixes between the rear surface of the photoelectric conversion element package 101 and the printed circuit board 102 by filling voids in a part where the solder balls of the electrodes 106 of the photoelectric conversion element package 101 are molten and bonded to the land of the printed circuit 102. Thus, generation of solder cracks due to a shearing force onto a soldered portion can be prevented. The shearing force is caused by repetitive temperature changes by operations of the imaging apparatus and environmental changes that result from a difference of thermal expansion coefficients between the photoelectric conversion element package 101 and the printed circuit board 102. Further, bonding reliability can be improved at the soldered portion between the photoelectric conversion element package 101 and the printed circuit board 102.

Figure 9:
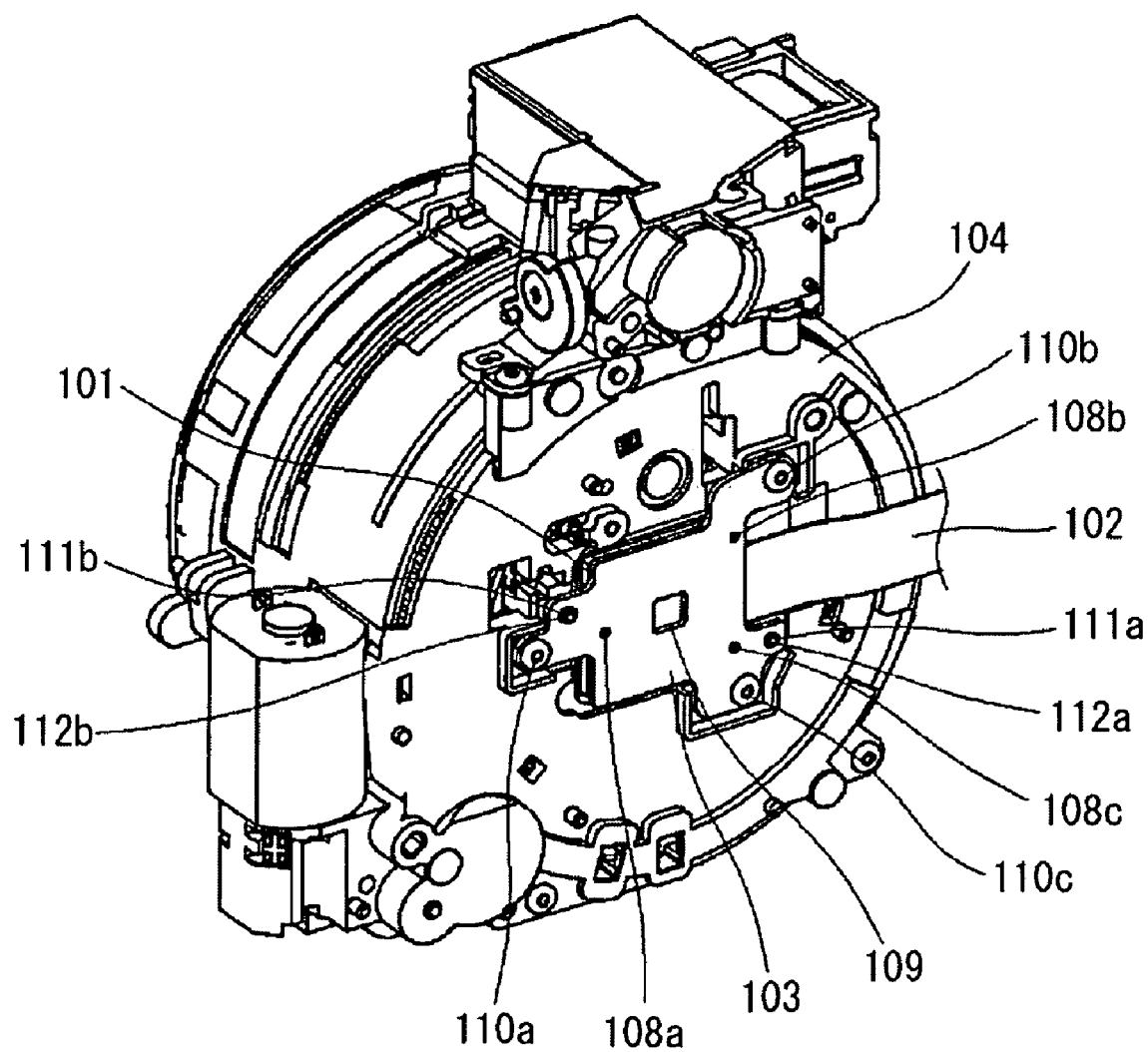
FIG. 9 is a perspective view in an assembled state illustrating a structure of the imaging apparatus according to the exemplary embodiment of the present invention.

An assembly of the photoelectric conversion element package 101, the printed circuit board 102, and the position retaining member 103 in FIG. 4 can be attached onto the photographic lens barrel unit 104 with screws 110a to 110c as illustrated in FIG. 9. FIG. 9 is a perspective view in an assembled state illustrating a structure of an imaging apparatus.

At this time, the photographic lens barrel unit 104 includes positioning protrusions 111a and 111b, as illustrated in FIG. 1, with which the corresponding positioning hole portions 112a and 112b formed on the position retaining member 103 are engaged. Thus, the positions of the position retaining member 103 and the photoelectric conversion element package 101 relative to the photographic lens barrel unit 104 in the planar direction orthogonal to the optical axis can be determined and fixed. At this time, three springs (only springs 113a and 113b are illustrated) provided on a recessed portion formed in the photographic lens barrel unit 104 urge the position retaining member 103 toward head portions of screws 110a to 110c in the optical-axis direction. Accordingly, by fine adjustment of each tightening amount of the screws 110a to 110c, the position of the position retaining member 103 in the optical-axis direction and an angle of the position retaining member 103 to the optical axis relative to the photographic lens barrel unit 104 can be finely adjusted. Thus, position of the light-receiving surface of the photoelectric conversion element 105 relative to an imaging surface (a surface perpendicular to the optical axis) of a photographic lens optical system in the photographic lens barrel unit 104 can be determined with high accuracy.

In the present exemplary embodiment, the photoelectric conversion element package 101 of BGA type is used, but when an LGA type package is used, the same effect can be achieved.

In the present exemplary embodiment, the protrusions 108a to 108c of the position retaining member 103 that abut on the rear surface of the photoelectric conversion element package 101 provided on the position retaining member 103 are formed by half-punching a metal plate. However, the protrusions 108a to 108c formed by drawing and bending, or a shape formed by cutting and raising can also be used. In this case, by enlarging a contact area with the rear surface of the photoelectric conversion element package 101 using the position retaining protrusions or the shape formed by cutting and raising, heat of the photoelectric conversion element package 101 can be effectively released from the position retaining member 103.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-218088 filed Aug. 24, 2007, which is hereby incorporated by reference herein in its entirety.

What is claimed is:

1. A photoelectric conversion element package retaining unit comprising:

a photoelectric conversion element package including electrodes formed on a rear surface of a light-receiving surface;

a printed circuit board electrically connected to the electrodes of the photoelectric conversion element package, wherein the printed circuit board has a first opening formed in an area corresponding to an inside of the electrodes of the photoelectric conversion element package; and a retaining member configured to retain the photoelectric conversion element package, wherein the retaining member includes:

a positioning unit configured to position the photoelectric conversion element package in an axial direction orthogonal to the light-receiving surface by abutting on the photoelectric conversion element package outside the electrodes of the photoelectric conversion element package; and a second opening formed to pour an adhesive into the area corresponding to the inside of the electrodes of the photoelectric conversion element package.

2. The photoelectric conversion element package retaining unit according to claim 1, wherein the second opening is smaller than the first opening.

3. The photoelectric conversion element package retaining unit according to claim 1, wherein the electrodes of the photoelectric conversion element package are arranged on the rear surface of the light-receiving surface in a doughnut shape.

4. The photoelectric conversion element package retaining unit according to claim 1, wherein the photoelectric conversion element package is a ball grid array (BGA) type package.

5. The photoelectric conversion element package retaining unit according to claim 1, wherein the photoelectric conversion element package is a land grid array (LGA) type package.

6. An imaging apparatus comprising:
   a photographic lens barrel unit including a photographic lens optical system;
   a photoelectric conversion element package including electrodes formed on a rear surface of a light-receiving surface;
   a printed circuit board electrically connected to the electrodes of the photoelectric conversion element package, wherein a first opening is formed in an area corresponding to an inside of the electrodes of the photoelectric conversion element package in the printed circuit board; and
   a retaining member configured to retain the photoelectric conversion element package so that the light-receiving surface of the photoelectric conversion element package is arranged perpendicular to an optical axis of the photographic lens optical system, wherein the retaining member includes:
   a positioning unit configured to position the photoelectric conversion element package in an axial direction orthogonal to the light-receiving surface by abutting on the photoelectric conversion element package outside the electrodes of the photoelectric conversion element package; and
   a second opening formed to pour an adhesive into the area corresponding to the inside of the electrodes of the photoelectric conversion element package.

7. The imaging apparatus according to claim 6, wherein the second opening is smaller than the first opening.

8. The imaging apparatus according to claim 6, wherein the electrodes of the photoelectric conversion element package are arranged on the rear surface of the light-receiving surface in a doughnut shape.

9. The imaging apparatus according to claim 6, wherein the photoelectric conversion element package is a ball grid array (BGA) type package.

10. The imaging apparatus unit according to claim 6, wherein the photoelectric conversion element package is a land grid array (LGA) type package.

* * * * *